US012244516B2

(12) United States Patent
Rajagopal

(10) Patent No.: US 12,244,516 B2
(45) Date of Patent: *Mar. 4, 2025

(54) ARCHITECTURE FOR HIGH PERFORMING DATA PLANE APPLICATIONS WITH SMART NETWORK INTERFACE ON COMPUTE SERVERS

(71) Applicant: RELIANCE JIO INFOCOMM USA, INC., Frisco, TX (US)

(72) Inventor: Arun Rajagopal, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,516

(22) Filed: Jan. 5, 2023

(65) Prior Publication Data

US 2023/0155961 A1 May 18, 2023

Related U.S. Application Data

(63) Continuation of application No. 17/152,283, filed on Jan. 19, 2021, now Pat. No. 11,552,904.

(51) Int. Cl.
*H04L 47/70* (2022.01)
*H04L 12/66* (2006.01)
*H04L 47/20* (2022.01)
*H04L 47/24* (2022.01)

(52) U.S. Cl.
CPC ............ *H04L 47/827* (2013.01); *H04L 12/66* (2013.01); *H04L 47/20* (2013.01); *H04L 47/24* (2013.01)

(58) Field of Classification Search
CPC ....... H04L 47/827; H04L 12/66; H04L 47/20; H04L 47/24; H04L 41/0894; G06F 9/45558; G06F 2009/45595
See application file for complete search history.

(56) References Cited

U.S. PATENT DOCUMENTS

| 2018/0205596 A1* | 7/2018 | Chu ...................... H04L 67/568 |
| 2020/0278892 A1* | 9/2020 | Nainar ..................... H04L 67/10 |
| 2023/0244582 A1* | 8/2023 | Sommers .............. G06F 11/221 |
| | | 714/33 |

* cited by examiner

*Primary Examiner* — Joe Chacko
(74) *Attorney, Agent, or Firm* — Jackson Walker LLP; Christopher J. Rourk

(57) ABSTRACT

A system for processing data, comprising a compute node having a first processor that is configured to receive a digital data message containing a request for computing services and to allocate processing resources on a network as a function of the request. A smart network interface controller (NIC) having a second processor that is configured to interface with the network and to send and receive data over the network associated with the computing services as a function of one or more policies. The smart NIC configured to receive policy update data and to implement the policy update data and to process the data that is sent and received over the network in accordance with the policy data.

20 Claims, 10 Drawing Sheets

ARCHITECTURE FOR HIGH PERFORMING DATA PLANE APPLICATIONS WITH SMART NETWORK INTERFACE ON COMPUTE SERVERS

RELATED APPLICATIONS

The present application is a continuation of U.S. patent application Ser. No. 17/152,283 filed Jan. 19, 2021, which is hereby incorporated by reference for all purposes as if set forth herein in its entirety.

TECHNICAL FIELD

The present disclosure relates generally to data processing, and more specifically to an architecture for high performing data plane applications with smart network interface controllers (NICs) on compute servers.

BACKGROUND OF THE INVENTION

Data networks can use a gateway with a network address translation table to route data to addresses on a private network, but these network address translation tables are generally not allocated to specific processes, and are instead used for all private network traffic over a public network.

SUMMARY OF THE INVENTION

A system for processing data is disclosed that includes a compute node that has a first processor that is configured to receive a digital data message containing a request for computing services and to allocate processing resources on a network as a function of the request. A smart NIC having a second processor is configured to interface with the network and to send and receive data over the network associated with the computing services as a function of one or more policies. The smart NIC is configured to receive policy update data, to implement the policy update data and to process the data that is sent and received over the network in accordance with the policy data.

Other systems, methods, features, and advantages of the present disclosure will be or become apparent to one with skill in the art upon examination of the following drawings and detailed description. It is intended that all such additional systems, methods, features, be and advantages included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
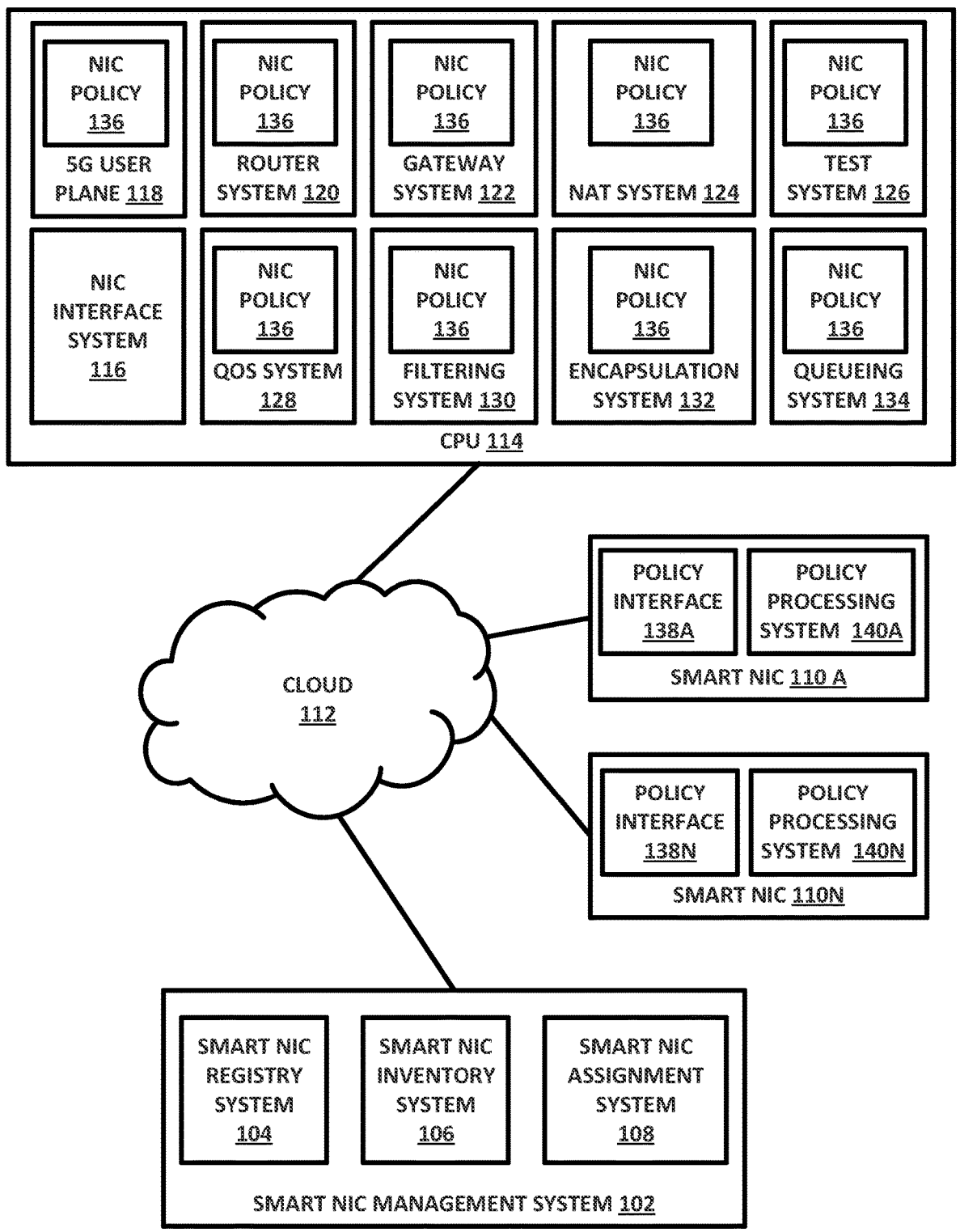
FIG. 1 is a diagram of system for providing intelligent data plane acceleration by offloading applications to distributed smart network interfaces, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Data plane applications running on computer servers are input/output (I/O) limited because of processing delays associated with processing all of the data packets for the computer server through the general purpose central processing unit (CPU) of the computer server. Application data throughput can be significantly enhanced by offloading certain packet processing steps onto a smart NIC, thereby eliminating the need for most packets to be handed off to the CPU and back from the NIC. A combination of high throughput packet processing on smart NICs and intelligent application architectures running on the CPU is disclosed that can together provide significant acceleration for data plane applications and improve network performance with associated efficiency gains.

For example, telephone company data plane applications can be re-architected to leverage smart NIC capabilities. Application components running on the CPU can run the application logic and create intelligent policies that will be pushed to any smart NIC that requires them, through specially defined programming interfaces. When a packet arrives at the NIC from the network, the NIC (which has been dynamically programmed by the CPU) can process the packet data instead of the CPU needing to do so. As disclosed herein, this architecture allows the smart NIC to be configured to perform the necessary packet treatment and pass the packet back to the network at speeds that are much higher than if the packet were to be handled through the CPU with traditional packet handling architectures.

FIG. 1 is a diagram of a system 100 for providing intelligent data plane acceleration by offloading applications to distributed smart network interfaces, in accordance with an example embodiment of the present disclosure. System 100 includes smart NIC management system 102, smart NIC registry system 104, smart NIC inventory system 106, smart NIC assignment system 108, smart NICs 110A through 110N, cloud 112, CPU 114, NIC interface system 116, 5G user plane system 118, router system 120, gateway system 122, network address table (NAT) system 124, test system 126, quality of service (QOS) system 128, filtering system 130, encapsulation system 132, queueing system 134, NIC policy system 136, policy interface systems 138A through 138N and policy processing systems 140A through 140N, each of which can be implemented in hardware or a suitable combination of hardware and software.

Smart NIC management system 102 can be implemented as one or more lines of code that are loaded into a memory of a processor and which cause the processor to perform management functions for a plurality of smart NICS in a cloud-based computing system or other suitable systems. In one example embodiment, smart NIC management system 102 can include a plurality of subsystems or can directly implement one or more functions associated with identifying smart NIC systems that are available for use in a cloud computing environment or other suitable computing environments and instantiating and provisioning the smart NIC systems as a function of the specific services that are needed. In this example embodiment, smart NIC management system 102 can be implemented as part of a cloud computing environment, a local area network, a wide area network or other suitable computing environments and can interface with smart NIC devices that are associated with the computing environment, such as smart NIC devices that are associated with a smart NIC server rack, with individual processing platforms within the computing environment or in other suitable manners.

Smart NIC registry system 104 can be implemented as one or more lines of code that are loaded into a memory of a processor and which cause the processor to perform registration functions for a plurality of smart NIC devices. In one example embodiment, a smart NIC registry can include an identification of active smart NIC devices, a correlation between an IP address for the active smart NIC devices and a network address for devices on the network, or other suitable registry-related information, where smart NIC registry system 104 can create, read, store, modify or otherwise functionally interact with associated registry data records stored in a data memory device. The devices on the network can include hardware devices, hardware devices with associated firmware or other suitable control data, containers, virtual machines or other suitable functional components.

Smart NIC inventory system 106 can be implemented as one or more lines of code that are loaded into a memory of a processor and which cause the processor to perform inventory functions for a plurality of smart NIC devices. In one example embodiment, a smart NIC inventory can include an identification of active smart NIC devices and inactive smart NIC devices, an identification of a location of smart NIC devices, an identification of functional capabilities of smart NIC devices and other suitable inventory-related information, where smart NIC inventory system 106 can create, read, store, modify or otherwise functionally interact with smart NIC inventory data records stored in a data memory device.

Smart NIC assignment system 108 can be implemented as one or more lines of code that are loaded into a memory of a processor and which cause the processor to perform the function of assigning a smart NIC to a device on the network. In one example embodiment, smart NIC assignment system 108 can monitor the functionality of an assigned smart NIC to determine whether it is necessary to assign a new smart NIC to a device, to de-allocate assigned devices from a smart NIC when the device is shut down or otherwise no longer requires smart NIC access, and other suitable functions. Smart NIC assignment system 108 can create, read, store, modify or otherwise functionally interact with smart NIC assignment data records stored in a data memory device.

Smart NICs 110A through 110N can be implemented as one or more lines of code that are loaded into a memory of a processor and which cause the processor to perform specific tasks that are allocated to the associated smart NIC. In one example embodiment, cloud 112 can be implemented using smart NICs 110A through 110N, such that the network interface functions associated with the cloud are allocated to one or more of smart NICs 110A through 110N through smart NIC management system 102 or other suitable cloud network interface management function. Smart NICs 110A through 110N can be instantiated as needed to support demand for network interface functionality, and can be assigned or reassigned as needed to maintain sufficient network interface resources for a current and expected load level. In another example embodiment, smart NICs 110A through 110N can function independently from cloud 112, and can be part of a local area network, a wide area network or other network architectures that can be used in conjunction with smart NIC management system 102 and associated systems and subsystems.

Cloud 112 can be implemented as one or more lines of code that are loaded into memory devices for processors and which cause the processors to perform distributed data processing and computing functions. In one example embodiment, cloud 112 can be implemented in conjunction with the other components of system 100 as part of an integrated and distributed processing platform, or can be used with additional devices or processing elements, with classes of different devices or processing elements or in other suitable manners.

CPU 114 can be implemented as one or more lines of code that are loaded into a memory of a processor and which cause the processor to perform specific tasks that are allocated to the processor. In one example embodiment, CPU 114 can be implemented such that the functions associated with cloud 112 are allocated through CPU 114. In another example embodiment, CPU 114 can function independently from cloud 112, and can be part of a local area network, a wide area network or other network architectures that can be used in conjunction with smart NIC management system. 102 and associated systems and subsystems.

NIC interface system 116 can be implemented as one or more lines of code that are loaded into memory devices for processors and which cause the processors to provide an interface between the sub-systems of CPU 114 and smart NICs 110A through 110N, to selectively configure the smart NICs to implement one or more policies. In one example embodiment, a specific smart NIC can be configured to perform specific functions, and NIC interface system 116 can keep track of the associated functions to update the relevant smart NICs when a new or revised policy is available or for other suitable purposes.

5G user plane system 118 can be implemented as one or more lines of code that are Load into memory devices for processors and which cause the processors to implement 5G user plane policies at predetermined smart NICs. In one example embodiment, a smart NIC can be allocated to perform 5G user plane processing for a telecommunications infrastructure, such as to provide an interconnect point between the mobile infrastructure and the data network, such as encapsulation and de-encapsulation of GPRS Tunnelling Protocol for the user plane, to provide mobility within and between radio access technologies as the Protocol Data Unit (PDU) session anchor point, to provide packet routing and forwarding such as by performing uplink classifier processing to direct flows to specific data networks based on traffic matching filters, to perform application detection using Service Data Flow (SDF) traffic filter templates, or to perform other suitable functions, such as those defined by the 3GPP technical specification 23.501.

Router system 120 can be implemented as one or more lines of code that are loaded into memory devices for processors and which cause the processors to implement call routing processing policies for a telecommunications infrastructure. In one example embodiment, call routing policies can include policies for determining whether a call is allowed or prohibited, policies for directing calls to predetermined network components and other suitable call routing policies.

Gateway system 122 can be implemented as one or more lines of code that are loaded into memory devices for processors and which cause the processors to implement gateway policies for a telecommunications infrastructure. In one example embodiment, gateway policies can include policies for determining how to process a call for a gateway device between telecommunications systems or domains, such as between a packet switched network and a circuit switched network, and other suitable gateway policies.

Network address table (NAT) system 124 can be implemented as one or more lines of code that are loaded into memory devices for processors and which cause the processors to implement NAT policies for a telecommunications infrastructure. In one example embodiment, NAT policies can include policies for determining whether to add or remove network address data to the network address table and other suitable network address table policies.

Test system 126 can be implemented as one or more lines of code that are loaded into memory devices for processors and which cause the processors to implement test policies for a telecommunications infrastructure. In one example embodiment, test policies can include policies for determining whether a test is allowed or prohibited, policies for directing test calls to predetermined network components and other suitable test policies.

Quality of service (QOS) system 128 can be implemented as one or more lines of code that are loaded into memory devices for processors and which cause the processors to implement QOS policies for a telecommunications infrastructure. In one example embodiment, QOS policies can include policies for determining the priority that should be assigned to processing a call relative to other call or data processing, policies for re assigning call processing priority and other suitable QOS policies.

Filtering system 130 can be implemented as one or more lines of code that are loaded into memory devices for processors and which cause the processors to implement filtering policies for a telecommunications infrastructure. In one example embodiment, filtering policies can include policies for determining whether data should be allowed or prohibited, policies for blocking access to external data sources and other suitable filtering policies.

Encapsulation system 132 can be implemented as one or more lines of code that are loaded into memory devices for processors and which cause the processors to implement encapsulation policies for a telecommunications infrastructure. In one example embodiment, encapsulation policies can include policies for passing data between different network layers and other suitable encapsulation policies.

Queueing system 134 can be implemented as one or more lines of code that are loaded into memory devices for processors and which cause the processors to implement queueing policies for a telecommunications infrastructure. In one example embodiment, queueing policies can include policies for determining whether to instantiate or shut down call processing resources or and other suitable queueing policies.

NIC policy system 136 can be implemented as one or more lines of code that are loaded into memory devices for processors and which cause the processors to implement NIC policies in conjunction with smart NICs 110A through 110N. In one example embodiment, a NIC policy for a specific smart BIC 110A through 110N can be identified by system 100 and can then be provided to a specific smart NIC 110A through 110N using NIC policy system 136 or in other suitable manners.

Policy interface systems 138A through 138N can each be implemented as one or more lines of code that are loaded into memory devices for processors of smart NICs 110A through 110N, respectively, and which cause the processors to receive policy data and policy update data from NIC interface system 116 or other suitable systems. In one example embodiment, when one of smart NICs 110A through 110N are instantiated, they can be provisioned to process predetermined types of data for predetermined functions, such as for one or more of 5G user plane system 118, router system 120, gateway system 122, network address table (NAT) system 124, test system 126, quality of service (QOS) system 128, filtering system 130, encapsulation system 132, queueing system 134 or other suitable types of data and functions. In this example embodiment, a container can be used to configure the smart NIC, such as by providing the policy data from distribution to a smart NIC using a container that also monitors the status of the smart NIC, that provides updates to the smart NIC, that de-allocates the smart NIC when it is no longer needed, that determines when a replacement smart NIC is needed due to a system failure or for other suitable purposes.

Policy processing systems 140A through 140N can each be implemented as one or more lines of code that are loaded into memory devices for processors of smart NICs 110A through 110N, respectively, and which cause the processors to implement policy data and policy update data from NIC interface system 116 or other suitable systems. In one example embodiment, the functions provided to each of smart NICs 110A through 110N when they are instantiated are implemented by policy processing systems 140A through 140N, respectively, such as by receiving packet data from cloud 112, by processing the packet data in accordance with the appropriate policy data and by sending packet data, blocking packet data, routing packet data, processing packet data, sending notification data or implementing other suitable smart NIC functions that would have previously have been implemented by a CPU of a server or other device. By using selected smart NICs for predetermined functions and distributing those functions based on loading and location, the time required to process network data traffic in accordance with network policies can be significantly reduced.

In operation, system 100 allows a plurality of smart NIC devices to be used in a more efficient manner in a network, and for policies to be updated on those smart NIC devices while the network is in operation. System 100 leverages the ability of smart NIC devices to perform functions that would normally be performed by a dedicated processor associated with the NIC, so as to allow a smart NIC to provide network interface services to multiple processors, multiple containers or to other network devices.

System 100 disaggregates the networking component (such as smart NICs 110A through 110N) from a compute host (such as CPU 114) that is running an associated application. This architecture allows a smart NIC registry system 104 to be maintained for use with a smart NIC inventory system 106 and associated allocation mechanisms, to assign resources from smart NICs 110A through 110N on demand to any suitable application that requires or requests those resources. The smart NICs 1101 through 110N can independently process data packets associated with the application in a predetermined manner without needing to send the packets to the compute node (such as a container or virtual machine), such as for encryption/decryption processing, firewall processing, TCP/IP processing, HTTP processing or other suitable dedicated processing. In this manner, system 100 can be used to provide a network wide registrar of smart NIC resources and smart NIC availability information, such as for use in a cloud computing environment or for other suitable purposes.

Figure 2:
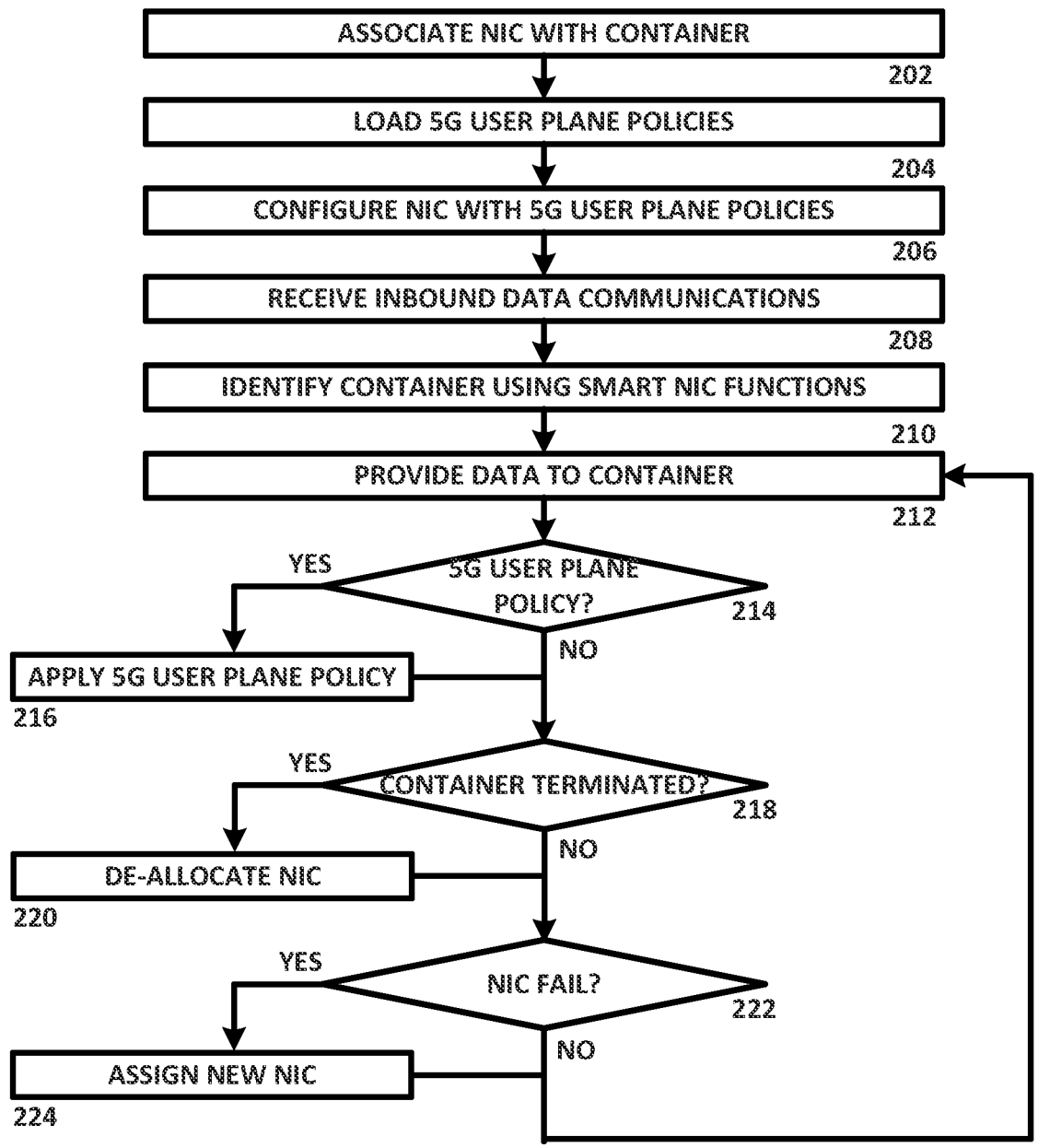
FIG. 2 is a diagram of an algorithm for providing 5G user plane policies to distributed smart NICs, in accordance with an example embodiment of the present disclosure.

FIG. 2 is a diagram of an algorithm 200 for providing 5G user plane policies to distributed smart NICs, in accordance with an example embodiment of the present disclosure. Algorithm 200 can be implemented in hardware or a suitable combination of hardware and software.

Algorithm 200 begins at 202, where one or more smart NIC is associated with one or more containers. In one example embodiment, smart NICs can be associated with containers on demand or in other suitable manners. The algorithm then proceeds to 204.

At 204, 5G user plane policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 206.

At 206, the smart NIC is loaded with the 5G user plane policies. In one example embodiment, a smart NIC can be configured to receive predetermined data packet formats that include 5G user plane policy data in a predetermined format that allows the smart NIC to implement the 5G user plane policies. The algorithm then proceeds to 208.

At 208, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 210.

At 210, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 212.

At 212, predetermined data is provided to the container. In one example embodiment, the data can include policy data that can be implemented by a smart NIC that is configured to provide functionality associated with the policy or other suitable data. The algorithm then proceeds to 214.

At 214, it is determined whether the data is 5G user plane policy data. In one example embodiment, the determination can be made at the smart NIC that receives the container data, by smart NIC management system, by a 5G user plane policy data system or in other suitable manners. If it is determined that the data is 5G user plane policy data, the algorithm then proceeds to 216, otherwise the algorithm proceeds to 218.

At 216, the 5G user plane policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 218.

At 218, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, the algorithm proceeds to 220, otherwise the algorithm proceeds to 222.

At 220, the smart NIC is de-allocated. In one example embodiment, de-allocation of the smart NIC can occur at a 5G user plane policy system as part of the smart NIC de-allocation process, or in other suitable manners. The algorithm then proceeds to 222.

At 222, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 224, where a new smart NIC is assigned to the container.

In operation, algorithm 200 can be used to provide 5G user plane policies to distributed smart network interfaces and other suitable functions. Although algorithm 200 is shown as a flow chart, a person of ordinary skill in the art will recognize that algorithm 200 can also or alternatively be implemented using object-oriented programming, a state diagram, a ladder diagram or in other suitable manners.

Figure 3:
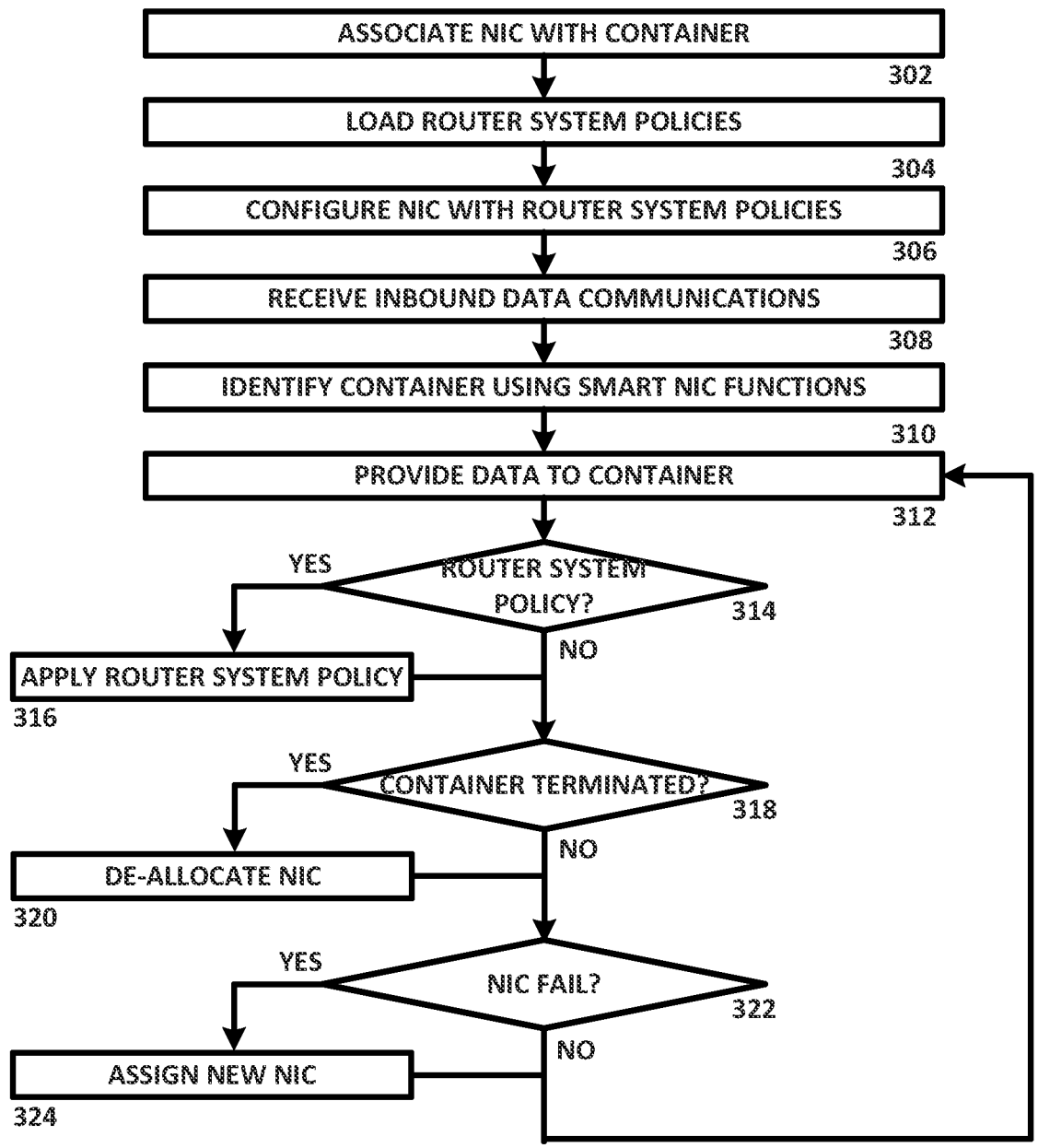
FIG. 3 is a diagram of an algorithm for providing router system policies to distributed smart NICs, in accordance with an example embodiment of the present disclosure.

FIG. 3 is a diagram of an algorithm 300 for providing router system policies to distributed smart NICs, in accordance with an example embodiment of: the present disclosure. Algorithm 300 can be implemented in hardware or a suitable combination of hardware and software.

Algorithm 300 begins at 302, where one or more smart NIC is associated with one or more containers. In one example embodiment, smart NICs can be associated with containers on demand or in other suitable manners. The algorithm then proceeds to 304.

At 304, router system policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 306.

At 306, the smart NIC is loaded with the router system. policies. In one example embodiment, a smart NIC can be configured to receive predetermined data packet formats that include router system policy data in a predetermined format that allows the smart NIC to implement the router system policies. The algorithm then proceeds to 308.

At 308, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 310.

At 310, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 312.

At 312, predetermined data is provided to the container. In one example embodiment, the data can include policy data that can be implemented by a smart NIC that is configured to provide functionality associated with the policy or other suitable data. The algorithm then proceeds to 314.

At 314, it is determined whether the data is router system policy data. In one example embodiment, the determination can be made at the smart NIC that receives the container data, by smart NIC management system, by a router system policy data system or in other suitable manners. If it is determined that the data is router system policy data, the algorithm then proceeds to 316, otherwise the algorithm proceeds to 318.

At 316, the router system policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 318.

At 318, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, the algorithm proceeds to 320, otherwise the algorithm proceeds to 322.

At 320, the smart NIC is de-allocated. In one example embodiment, de-allocation of the smart NIC can occur at a router system policy system as part of the smart NIC de-allocation process, or in other suitable manners. The algorithm then proceeds to 322.

At 322, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 324, where a new smart NIC is assigned to the container.

In operation, algorithm 300 can be used to provide router plane policy distribution in a distributed smart NIC environment, and other suitable functions. Although algorithm 300 is shown as a flow chart, a person of ordinary skill in the art will recognize that algorithm 300 can also or alternatively be implemented using object-oriented programming, a state diagram, a ladder diagram or in other suitable manners.

Figure 4:
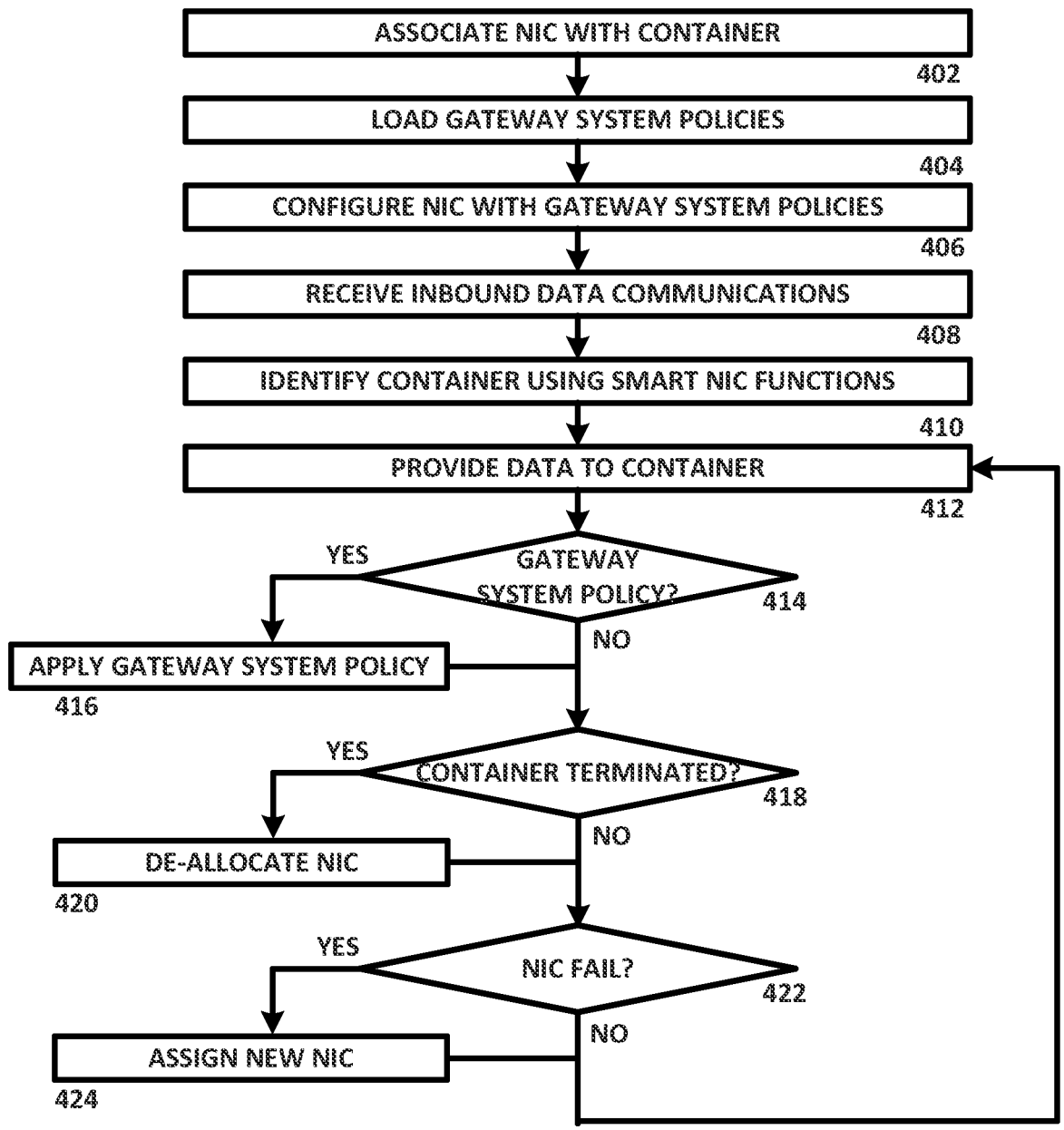
FIG. 4 is a diagram of an algorithm for providing gateway system policies to distributed smart NICs, in accordance with an example embodiment of tine present disclosure.

FIG. 4 it is a diagram of an algorithm 400 for providing gateway system policies to distributed smart NICs, in accordance with an example embodiment of the present disclosure. Algorithm 400 can be implemented in hardware or a suitable combination of hardware and software.

Algorithm 400 begins at 402, where one or more smart NIC is associated with one or more containers. In one example embodiment, smart NICs can be associated with containers on demand or in other suitable manners. The algorithm then proceeds to 404.

At 404, gateway system policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 406.

At 406, the smart NIC is loaded with the gateway system policies. In one example embodiment, a smart NIC can be configured to receive predetermined data packet formats that include gateway system policy data in a predetermined format that allows the smart NIC to implement the gateway system policies. The algorithm then proceeds to 408.

At 408, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 410.

At 410, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 412.

At 412, predetermined data is provided to the container. In one example embodiment, the data can include policy data that can be implemented by a smart NIC that is configured to provide functionality associated with the policy or other suitable data. The algorithm then proceeds to 414.

At 414, it is determined whether the data is gateway system policy data. In one example embodiment, the determination can be made at the smart NIC that receives the container data, by smart NIC management system, by a gateway system policy data system. or in other suitable manners. If it is determined that the data is gateway system policy data, the algorithm then proceeds to 416, otherwise the algorithm proceeds to 418.

At 416, the gateway system policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 418.

At 418, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, the algorithm proceeds to 420, otherwise the algorithm proceeds to 422.

At 420, the smart NIC is de-allocated. In one example embodiment, de-allocation of the smart NIC can occur at a gateway system policy system as part of the smart NIC de-allocation process, or in other suitable manners. The algorithm then proceeds to 422.

At 422, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 424, where a new smart NIC is assigned to the container.

In operation, algorithm 400 can be used to provide gateway system policies to distributed smart NICs and other suitable functions. Although algorithm 400 is shown as a flow chart, a person of ordinary skill in the art will recognize that algorithm 400 can also or alternatively be implemented using object-oriented programming, a state diagram, a ladder diagram or in other suitable manners.

Figure 5:
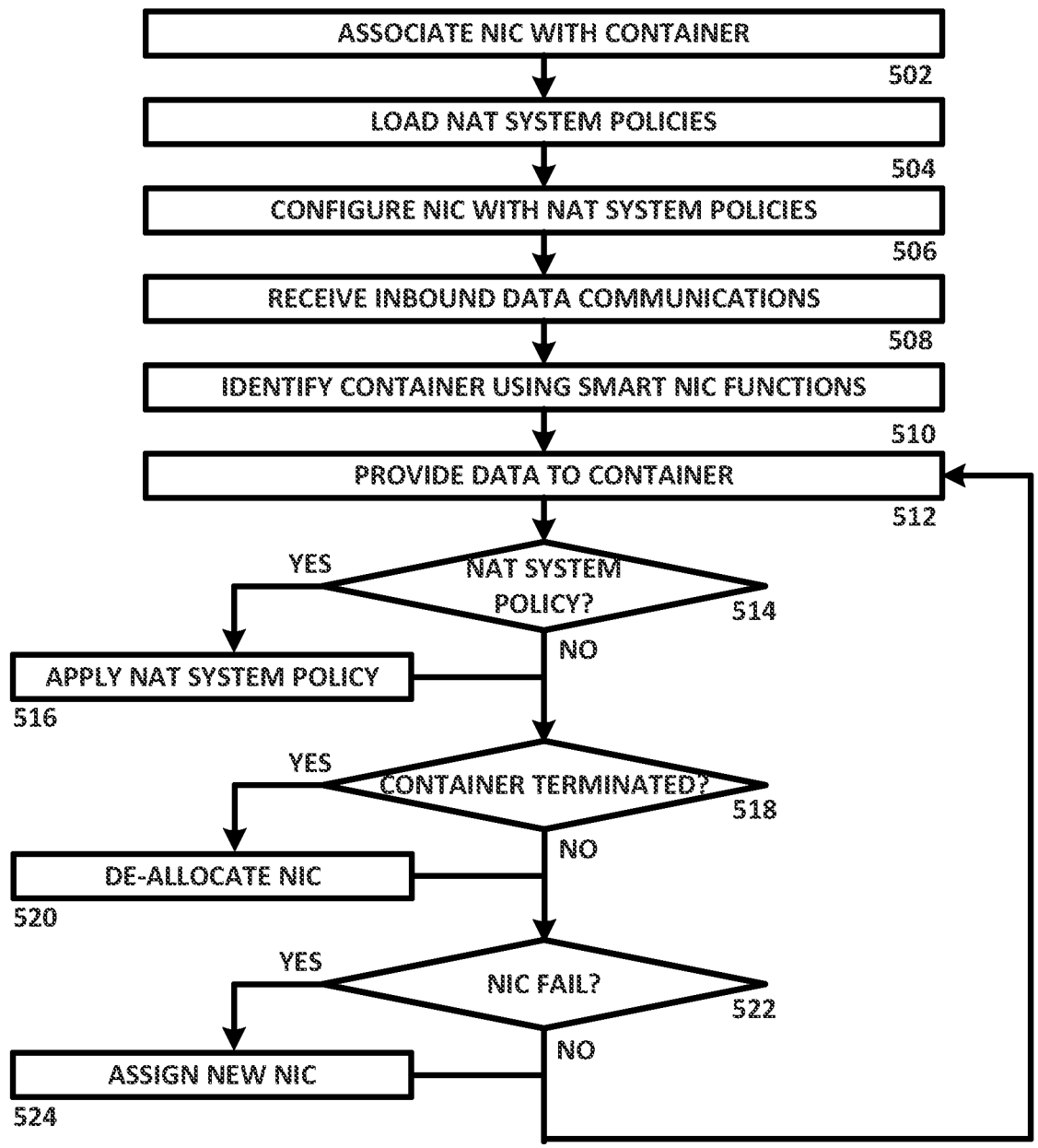
FIG. 5 is a diagram of an algorithm for providing NAT system policies to distributed smart NICs, in accordance with an example embodiment of the present disclosure.

FIG. 5 is a diagram of an algorithm 500 for providing NAT system policies to distributed smart NICs, in accordance with an example embodiment of the present disclosure. Algorithm 500 can be implemented in hardware or a suitable combination of hardware and software.

Algorithm 500 begins at 502, where one or more smart NIC is associated with one or more containers. In one example embodiment, smart NICs can be associated with containers on demand or in other suitable manners. The algorithm then proceeds to 504.

At 504, NAT system policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 506.

At 506, the smart NIC is loaded with the NAT system policies. In one example embodiment, a smart NIC can be configured to receive predetermined data packet formats that include NAT system policy data in a predetermined format that allows the smart NIC to implement the NAT system policies. The algorithm then proceeds to 508.

At 508, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 510.

At 510, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 512.

At 512, predetermined data is provided to the container. In one example embodiment, the data canal include policy data that can be implemented by a smart NIC that is configured to provide functionality associated with the policy or other suitable data. The algorithm then proceeds to 514.

At 514, it is determined whether the data is NAT system policy data. In one example embodiment, the determination can be made at the smart NIC that receives the container data, by smart NIC management system, by a NAT system policy data system or in other suitable manners. If it is determined that the data is NAT system policy data, the algorithm then proceeds to 516, otherwise the algorithm proceeds to 518.

At 516, the NAT system policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 518.

At 518, it is determined whether the container using the smart NIC functions has been terminated. In example embodiment, a smart NIC can be instantiated and provisioned using a container that is used to manage the operations of the smart NIC until it is no longer needed, at which point the container can be terminated. If it is determined that the container has been terminated, the algorithm proceeds to 520, otherwise the algorithm proceeds to 522.

At 520, the smart NIC is de-allocated. In one example embodiment, de-allocation of the smart NIC can occur at a NAT system policy system as part of the smart NIC de-allocation process, or in other suitable manners. The algorithm then proceeds to 522.

At 522, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 524, where a new smart NIC is assigned to the container.

In operation, algorithm 500 call be used to provide NAT system policies to distributed smart NICs and other suitable functions. Although algorithm 500 is shown as a flow chart, a person of ordinary skill in the art will recognize that algorithm 500 can also or alternatively be implemented using object-oriented. programming, a state diagram, a ladder diagram or in other suitable manners.

Figure 6:
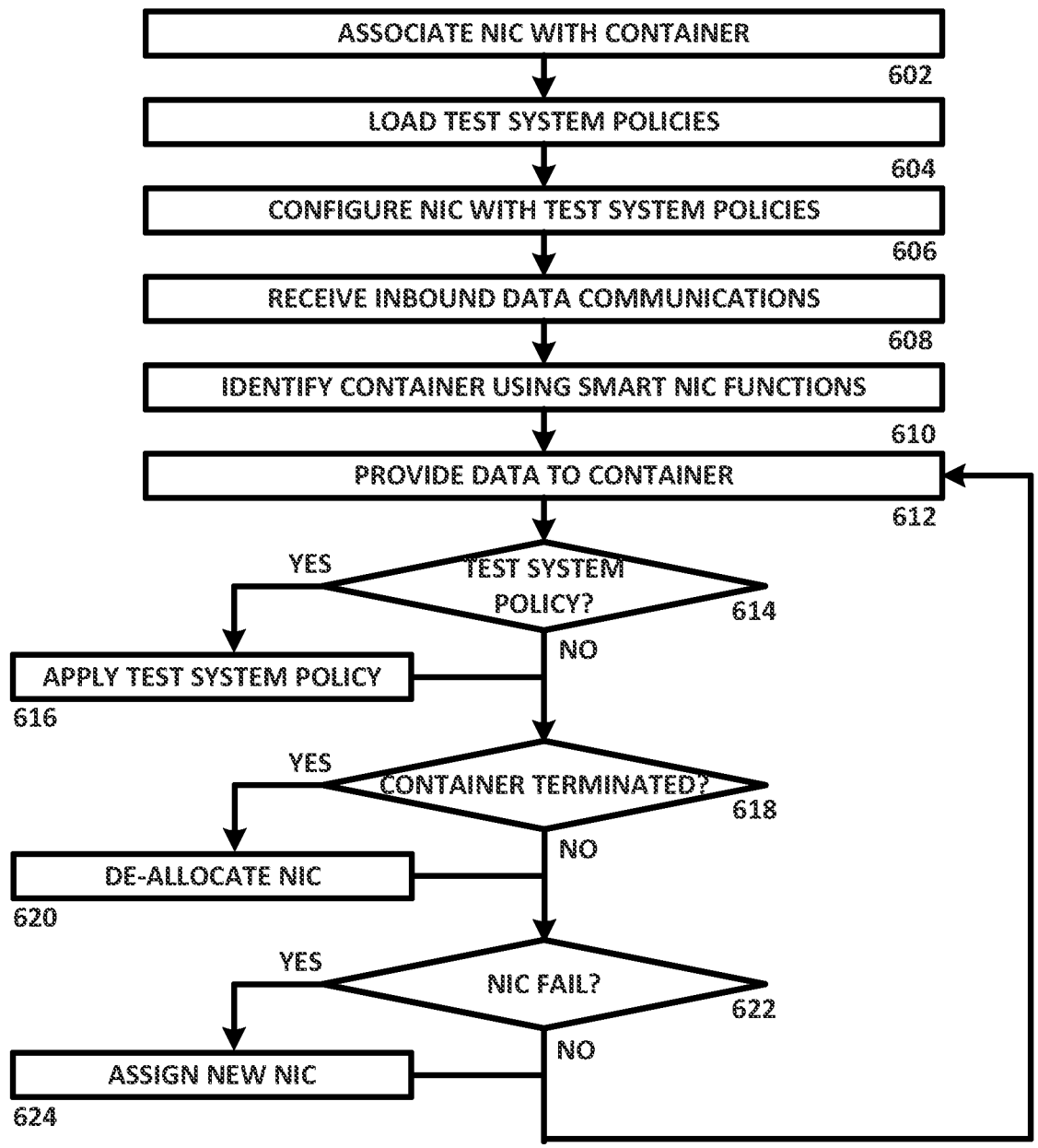
FIG. 6 is a diagram of an algorithm for providing test system policies to distributed smart NICs, in accordance with an example embodiment of the present disclosure.

FIG. 6 is a diagram of an algorithm 600 for providing test system policies to distributed smart NICs, in accordance with an example embodiment of the present disclosure. Algorithm 600 can be implemented in hardware or a suitable combination of hardware and software.

Algorithm 600 begins at 602, where one or more smart NIC is associated with one or more containers. In one example embodiment, smart NICs can be associated with containers on demand or in other suitable manners. The algorithm then proceeds to 604.

At 604, test system policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 606.

At 606, the smart NIC is loaded with the test system policies. In one example embodiment, a smart NIC can be configured to receive predetermined data packet formats that include test system policy data in a predetermined format that allows the smart NIC to implement the test system policies. The algorithm then proceeds to 608.

At 608, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 610.

At 610, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 612.

At 612, predetermined data is provided to the container. In one example embodiment, the data can include policy data that can be implemented by a smart NIC that is configured to provide functional associated with the policy or other suitable data. The algorithm then proceeds to 614.

At 614, it is determined whether the data is test system policy data. In one example embodiment, the determination can be made at the smart NIC that receives the container data, by smart NIC management system, by a test system policy data system or in other suitable manners. If it is determined that the data is test system policy data, the algorithm then proceeds to 616, otherwise the algorithm proceeds to 618.

At 616, the test system policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 618.

At 618, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, the algorithm proceeds to 620, otherwise the algorithm proceeds to 622.

At 620, the smart NIC is de-allocated. In one example embodiment, de-allocation of the smart NIC can occur at a test system policy system as part of the smart NIC de-allocation process, or in other suitable manners. The algorithm then proceeds to 622.

At 622, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 624, where a new smart NIC is assigned to the container.

In operation, algorithm 600 can be used to provide test system policies to distributed smart NICs and other suitable functions. Although algorithm 600 is shown as a flow chart, a person of ordinary skill in the art will recognize that algorithm 600 can also or alternatively be implemented using object-oriented programming, a state diagram, a ladder diagram or in other suitable manners.

Figure 7:
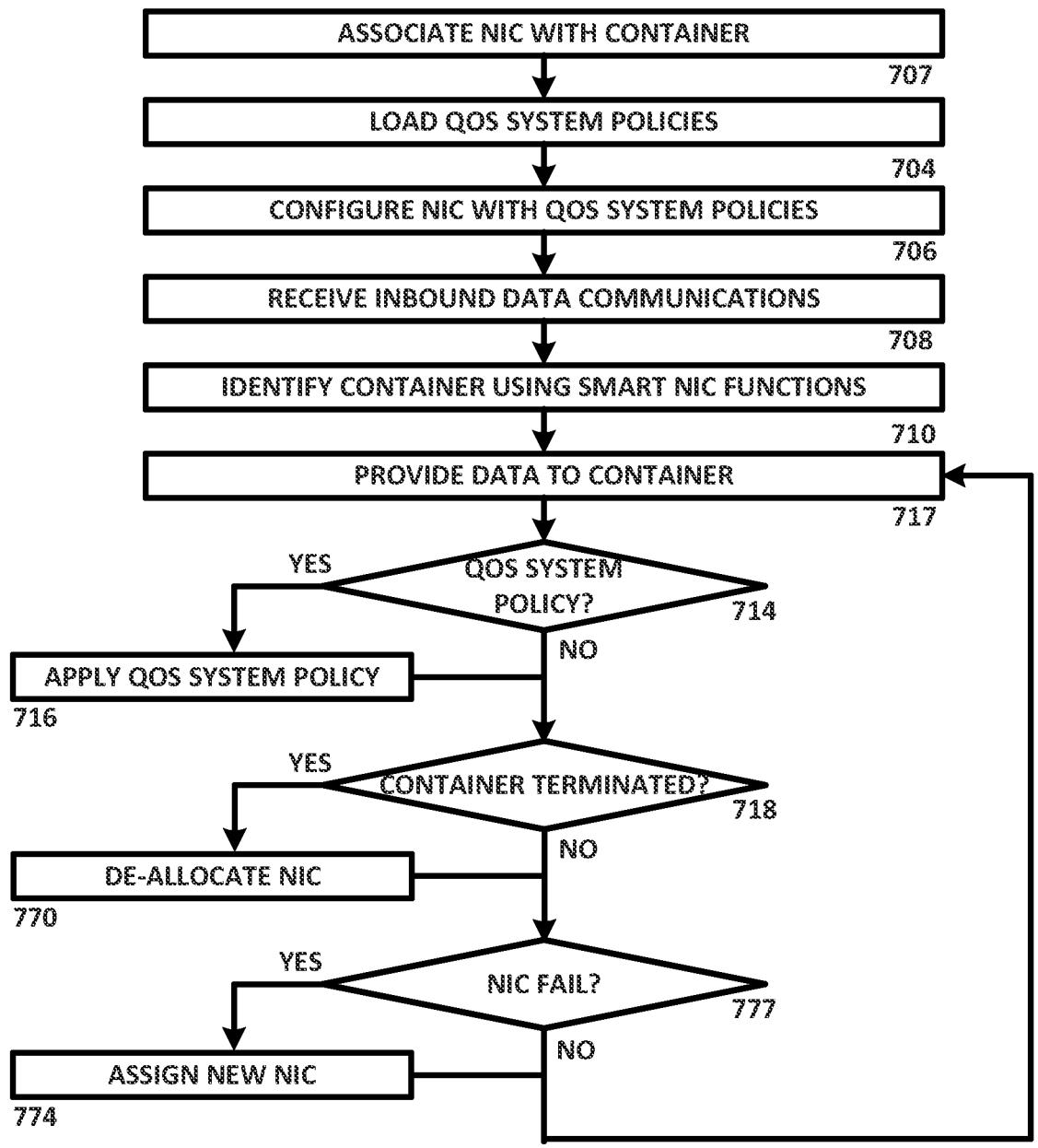
FIG. 7 is a diagram of an algorithm for providing QOS system policies to distributed smart NICs, in accordance with an example embodiment of the present disclosure.

FIG. 7 is a diagram of an algorithm 700 for providing QOS system policies to distributed smart NICs, in accordance with an example embodiment of the present disclosure. Algorithm 700 can be implemented in hardware or a suitable combination of hardware and software.

Algorithm 700 begins at 702, where one or more smart NIC is associated with one or more containers. In one example embodiment, smart NICs can be associated with containers on demand or in other suitable manners. The algorithm then proceeds to 704.

At 704, QOS system policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 706.

At 706, the smart NIC is loaded with the QOS system policies. In one example embodiment, a smart NIC can be configured to receive predetermined data packet formats that include QOS system policy data in a predetermined format that allows the smart NIC to implement the QOS system policies. The algorithm then proceeds to 708.

At 708, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 710.

At 710, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 712.

At 712, predetermined data is provided to the container. In one example embodiment, the data can include policy data that can be implemented by a smart NIC that is configured to provide functionality associated with the policy or other suitable data. The algorithm then proceeds to 714.

At 714, it is determined whether the data is QOS system policy data. In one example embodiment, the determination can be made at the smart NIC that receives the container data, by smart NIC management system, by a QOS system policy data system or in other suitable manners. If it is determined that the data is QOS system policy data, the algorithm then proceeds to 716, otherwise the algorithm proceeds to 710.

At 716, the QOS system policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 718.

At 718, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, the algorithm proceeds to 720, otherwise the algorithm proceeds to 722.

At 720, the smart NIC is de-allocated. In one example embodiment, de-allocation of the smart NIC can occur at a QOS system policy system as part of the smart NIC de-allocation process, or in other suitable manners. The algorithm then proceeds to 722.

At 722, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 724, where a new smart NIC is assigned to the container.

In operation, algorithm 700 can be used to provide QOS system policies to distributed smart NICs and other suitable functions. Although algorithm 700 is shown as a flow chart, a person of ordinary skill in the art will recognize that algorithm 700 can also or alternatively be implemented using object-oriented programming, a state diagram, a ladder diagram or in other suitable manners.

Figure 8:
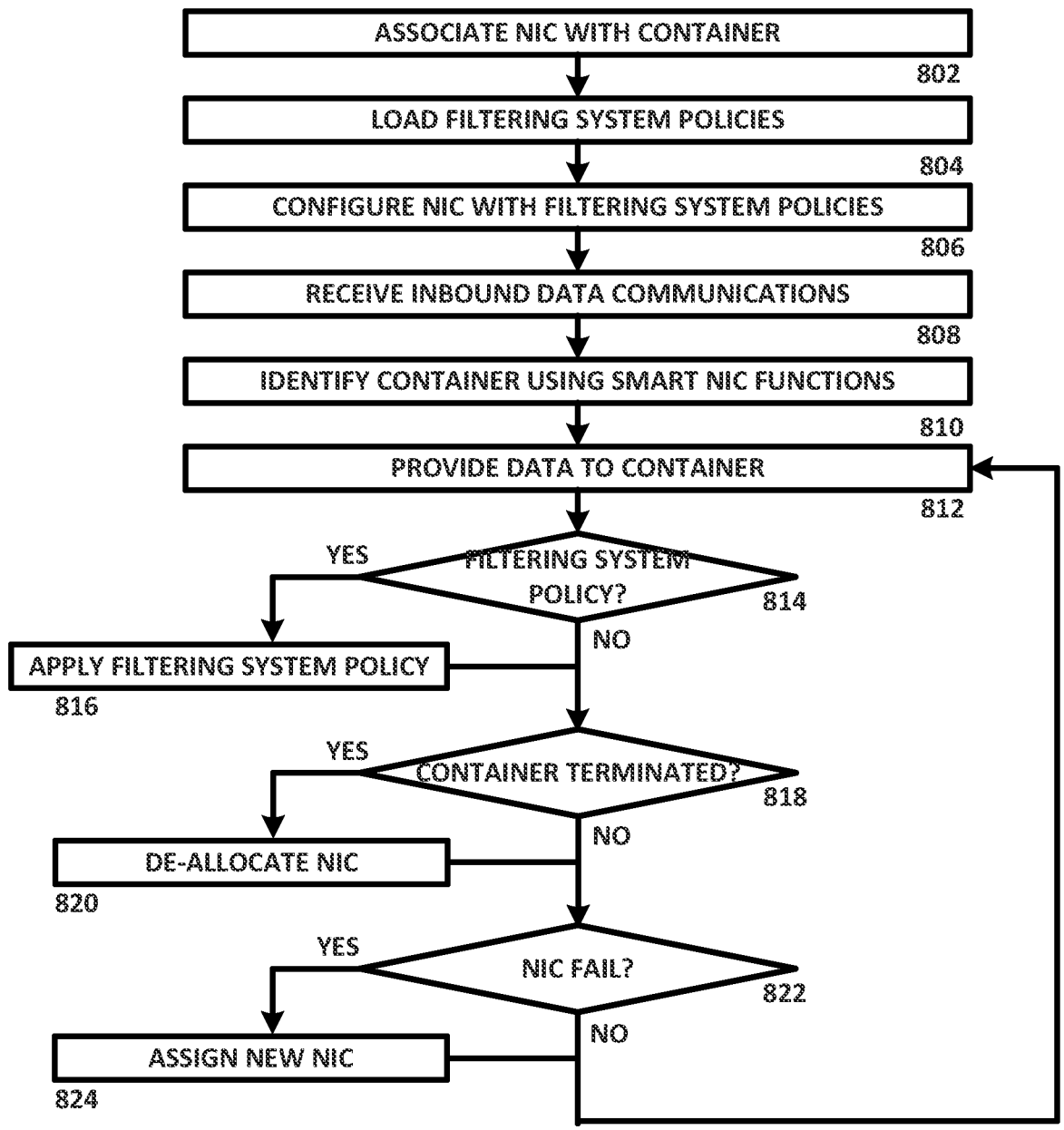
FIG. 8 is a diagram of an algorithm for providing filtering system policies to distributed smart NICs, in accordance with an example embodiment of the present disclosure.

FIG. 8 is a diagram of an algorithm 800 for providing filtering system policies to distributed smart NICs, in accordance with an example embodiment of: the present disclosure. Algorithm 800 can be implemented in hardware or a suitable-combination of hardware and software.

Algorithm 800 begins at 802, where one or more smart NIC is associated with one or more containers. In one example embodiment, smart NICs can be associated with containers on demand or in other suitable manners. The algorithm then proceeds to 804.

At 804, filtering system policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 806.

At 806, the smart NIC is loaded with the filtering system policies. In one example embodiment, a smart NIC can be configured to receive predetermined data packet formats that include filtering system policy data in a predetermined format that allows the smart NIC to implement the filtering system policies. The algorithm then proceeds to 808.

At 808, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 810.

At 810, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 812.

At 812, predetermined data is provided to the container. In one example embodiment, the data can include policy data that can be implemented by a smart NIC that is configured to provide functional associated with the policy or other suitable data. The algorithm then proceeds to 814.

At 814, it is determined whether the data is filtering system policy data. In one example embodiment, the determination can be made at the smart NIC that receives the container data, by smart NIC management system, by a filtering system policy data system or in other suitable manners. If it is determined that the data is filtering system policy data, the algorithm then proceeds to 816, otherwise the algorithm proceeds to 818.

At 816, the filtering system policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 818.

At 818, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, the algorithm proceeds to 820, otherwise the algorithm proceeds to 822.

At 820, the smart NIC is de-allocated. In one example embodiment, de-allocation of the smart NIC can occur at a filtering system policy system as part of the smart NIC de-allocation process, or in other suitable manners. The algorithm then proceeds to 822.

At 822, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 824, where a new smart NIC is assigned to the container.

In operation, algorithm 800 can be used to provide filtering system policies to distributed smart NICs and other suitable functions. Although algorithm 800 is shown as a flow chart, a person of ordinary skill in the art will recognize that algorithm 800 can also or alternatively be implemented using object-oriented programming, a state diagram, a ladder diagram or in other suitable manners.

Figure 9:
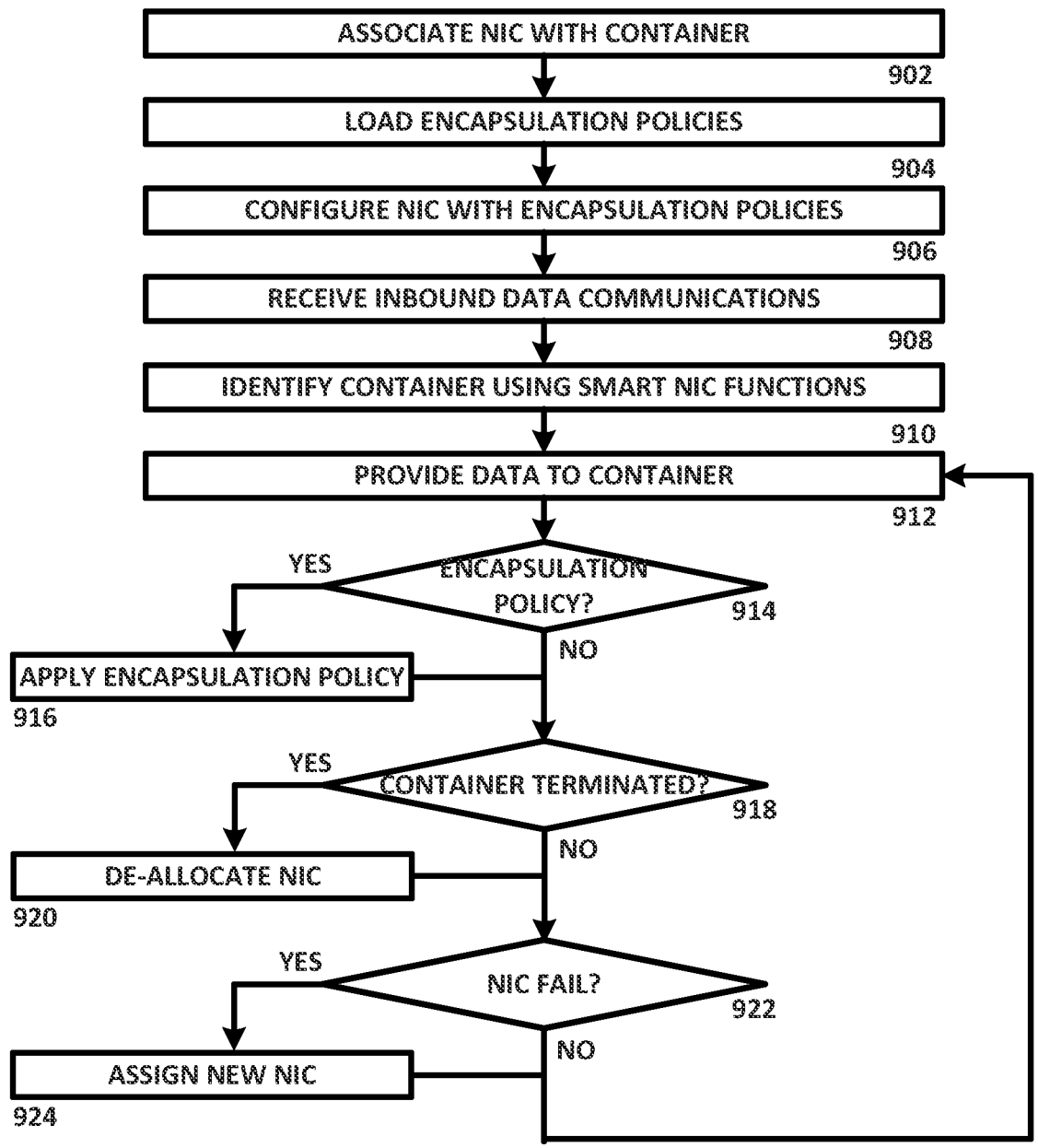
FIG. 9 is a diagram of an algorithm for providing encapsulation policies to distributed smart NICs, in accordance with an example embodiment of the present disclosure.

FIG. 9 is a diagram of an algorithm 900 for providing encapsulation policies to distributed smart NICs, in accordance with an example embodiment of the present disclosure. Algorithm 900 can be implemented in hardware or a suitable combination of hardware and software.

Algorithm 900 begins at 902, where one or more smart NIC is associated with one or more containers. In one example embodiment, smart NICs can be associated with containers on demand or in other suitable manners. The algorithm then proceeds to 904.

At 904, encapsulation policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 906.

At 906, the smart NIC is loaded with the encapsulation policies. In one example embodiment, a smart NIC can be configured to receive predetermined data packet formats that include encapsulation policy data in a predetermined format that allows the smart NIC to implement encapsulation policies. The algorithm then proceeds to 908.

At 908, inbound data communications are received at the smart NIC. In one example embodiment, the inbound data communications can be addressed to address associated with the smart NIC, to allow the smart NIC to perform predetermined data processing, or the inbound data communications can be received in suitable manners. The algorithm then proceeds to 910.

At 910, a container identified using a predetermined smart NIC function. In one example embodiment, the container can be configured to provide policy data to one or more smart NIC devices, to monitor smart NIC status or other suitable container functions can also or alternatively be used. The algorithm then proceeds to 912.

At 912, predetermined data is provided to the container. In one example embodiment, the data can include policy data that can be implemented by a smart NIC that is configured to provide functionality associated with the policy or other suitable data. The algorithm then proceeds to 914.

At 914, it is determined whether the data is encapsulation policy data. In one example embodiment, the determination can be made at the smart NIC that receives the container data, by smart NIC management system, by a encapsulation policy data system or in other suitable manners. If it is determined that the data is encapsulation policy data, the algorithm then proceeds to 916, otherwise the algorithm proceeds to 918.

At 916, the encapsulation policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 918.

At 918, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, the algorithm proceeds to 920, otherwise the algorithm proceeds to 922.

At 920, the smart NIC is de-allocated. In one example embodiment, de-allocation of the smart NIC can occur at a encapsulation policy system as part of the smart NIC de-allocation process, or in other suitable manners. The algorithm then proceeds to 922.

At 922, it is determined whether the smart NIC has failed. In one example embodiment, a smart NIC failure can be determined if the smart NIC fails to respond to a data message, if the smart NIC fails to provide a status indicator or in other suitable manners. If it is determined that the smart din has failed, the algorithm proceeds to 924, where a new smart NIC is assigned to the container.

In operation, algorithm 900 can be used to provide encapsulation policies to distributed smart NICs and other suitable functions. Although algorithm 900 is shown as a flow chart, a person of ordinary skill in the art will recognize that algorithm 900 can also or alternatively be implemented using object-oriented programming, a state diagram, a ladder diagram or in other suitable manners.

Figure 10:
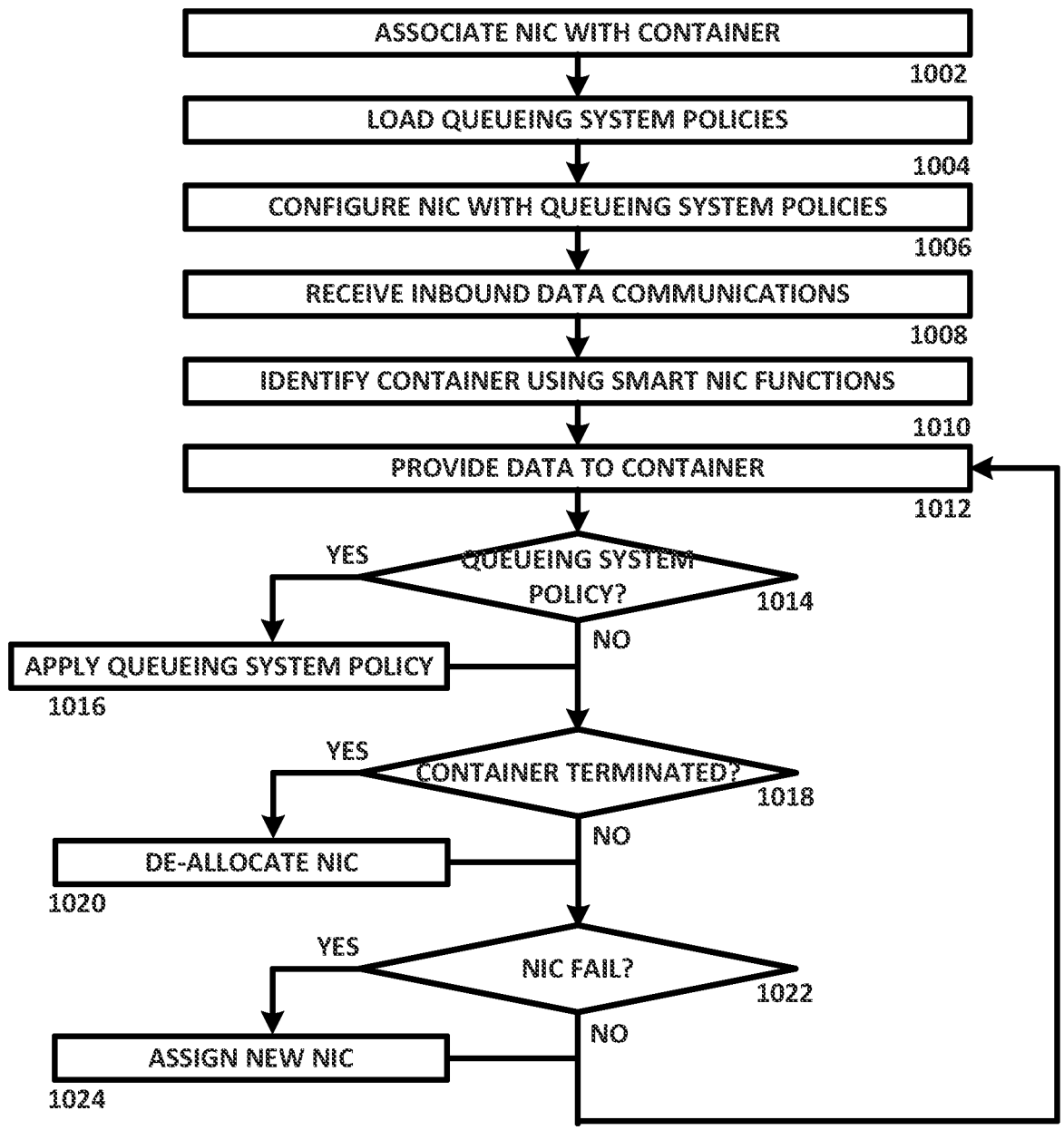
FIG. 10 is a diagram of an algorithm for providing queueing system policies to distributed smart NICs, in accordance with an example embodiment of the present disclosure.

FIG. 10 is a diagram of an algorithm 1000 for providing queueing system policies to distributed smart NICs, in accordance with an example embodiment of the present disclosure. Algorithm 1000 can be implemented in hardware or a suitable combination of hardware and software.

Algorithm 1000 begins at 1002, where one or more smart NIC is associated with one or more containers. In one example embodiment, smart NICs can be associated with containers on demand or in other suitable manners. The algorithm then proceeds to 1004.

At 1004, queueing system policies are loaded to a predetermined smart NIC. In one example embodiment, a smart NIC policy system can be used monitor smart NIC policy status for a policy system, and can identify smart NICs that are associated with predetermined policies. Other suitable processes can also or alternatively be used. The algorithm then proceeds to 1006.

At 1006, the smart NIC is loaded with the queueing system policies. In one example embodiment, a smart NIC can be configured to receive predetermined data packet formats that include queueing system policy data in a predetermined format that allows the smart NIC to implement the queueing system policies. The algorithm then proceeds to 1008.

At 1008, inbound data communications are received at the smart NIC. In one example embodiment, the inbound data communications can be addressed to an address associated with the smart NIC, to allow the smart NIC to perform predetermined data processing, or the inbound data communications can be received in suitable manners. The algorithm then proceeds to 1010.

At 1010, a container is identified using a predetermined smart NIC function. In one example embodiment, the container can be configured to provide policy data to one or more smart NIC devices, to monitor smart NIC status or other suitable container functions can also or alternatively be used. The algorithm then proceeds to 1012.

At 1012, predetermined data is provided to the container. In one example embodiment, the data can include policy data that can be implemented by a smart NIC that is configured to provide functionality associated with the policy or other suitable data. The algorithm then proceeds to 1014.

At 1014, it is determined whether the data is queueing system policy data. In one example embodiment, the determination can be made at the smart NIC that receives the container data, by smart NIC management system, by a queueing system policy data system or in other suitable manners. If it is determined that the data is queueing system policy data, the algorithm then proceeds to 1016, otherwise the algorithm proceeds to 1018.

At 1016, the queueing system policy data is applied at the smart NIC. In one example embodiment, the smart NIC can be configured to receive and implement policy data in a predetermined format, such as to store defined algorithmic controls in predetermined data storage locations or formats to allow a processor component of the smart NIC to execute the algorithmic controls, or in other suitable manners. The algorithm then proceeds to 1018.

At 1018, it is determined whether the container using the smart NIC functions has been terminated. In one example embodiment, a smart NIC can be instantiated and provisioned using a container that is used to manage the operations of the smart NIC until it is no longer needed, at which point the container can be terminated. If it is determined that the container has been terminated, algorithm proceeds to 1020, otherwise the algorithm proceeds to 1022.

At 1020, the smart NIC is de-allocated. In one example embodiment, de-allocation of the smart NIC can occur at a queueing system policy system as part of the smart NIC de-allocation process, or in other suitable manners. The algorithm then proceeds to 1022.

At 1022, it is determined whether the smart NIC has failed. In one example embodiment, a smart NIC failure can be determined if the smart NIC fails to respond to a data message, if the smart NIC fails to provide a status indicator or in other suitable manners. If it is determined that the smart NIC has failed, the algorithm proceeds to 1024, where a new smart NIC is assigned to the container.

In operation, algorithm 1000 can be used to provide queueing system policies to distributed smart NICs and other suitable functions. Although algorithm 1000 is shown as a flow chart, a person of ordinary skill in the art will recognize that algorithm 1000 can also or alternatively be implemented using object-oriented programming, a state diagram, a ladder diagram or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then complied into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing data, comprising:
a compute node having a first processor that is configured to receive a digital data message containing a request for computing services and to allocate processing resources on a network as a function of the request;
a smart network interface controller (NIC) having a second processor that is configured to interface with the network, to implement test policy update data and to process network data that is sent and received over the network in accordance with the test policy update data to direct test calls to predetermined network components.

2. The system of claim 1 wherein the smart NIC is configured to implement 5G user plane policy data to process the network data.

3. The system of claim 1 wherein the smart NIC is configured by the test policy update data to determine whether a test is allowed.

4. The system of claim 1 wherein the smart NIC is configured to implement router system policy data to de-allocate the smart NIC.

5. The system of claim 1 wherein the smart NIC is configured to implement gateway system policy data to process a call for a gateway device between a packet switched network and a circuit switched network.

6. The system of claim 1 wherein the smart NIC is configured to implement network address table (NAT) policy data to process the network data.

7. The system of claim 1 wherein the smart NIC is configured to implement quality of service (QOS) system policy data to process the network data.

8. The system of claim 1 wherein the smart NIC is configured to implement filtering system policy data to process the network data.

9. The system of claim 1 wherein the smart NIC is configured to implement encapsulation system policy data to process the network data.

10. The system of claim 1 wherein the smart NIC is configured to implement queueing system policy data to process the network data.

11. A method for processing data, comprising:
receiving filtering policy update data at a smart network interface controller (NIC);
implementing the filtering policy update data at the smart NIC; and
processing network data that is sent and received over the network in accordance with the updated filtering policy data at the smart NIC to block access to an external data source.

12. The method of claim 11 further comprising implementing 5G user plane policy data at the smart NIC to process the network data to perform application detection using Service Data Flow (SDF) traffic filter templates.

13. The method of claim 11 further comprising implementing router system policy data at the smart NIC to process the network data.

14. The method of claim 11 further comprising implementing gateway system policy data at the smart NIC to process the network data.

15. The method of claim 11 further comprising implementing network address table (NAT) policy data at the smart NIC to process the network data.

16. The method of claim 11 further comprising implementing test system policy data at the smart NIC to process the network data to determine whether a test for a component is prohibited.

17. The method of claim 11 further comprising implementing quality of service (QOS) system policy data at the smart NIC to process the network data.

18. The method of claim 11 further comprising implementing encapsulation system policy data at the smart NIC to pass the network data between different network layers.

19. A system for processing data, comprising:
a compute node having a first processor that is configured to receive a digital data message containing a request for computing services and to allocate processing resources on a network as a function of the request;
a smart network interface controller (NIC) having a second processor that is configured to interface with the network, to implement filtering policy update data and to process network data that is sent and received over the network in accordance with the filtering policy update data to allow access to an external data source for a predetermined component.

20. The system of claim 19 wherein the smart NIC is configured to implement 5G user plane policy data to process the network data.

* * * * *

UNITED STATES PATENT AND TRADEMARK OFFICE
CERTIFICATE OF CORRECTION

PATENT NO. : 12,244,516 B2
APPLICATION NO. : 18/093516
DATED : March 4, 2025
INVENTOR(S) : Arun Rajagopal Page 1 of 1

It is certified that error appears in the above-identified patent and that said Letters Patent is hereby corrected as shown below:

In the Specification

1. In Column 1, Line 46, delete "be and advantages" and insert -- and advantages be --, therefor.
2. In Column 1, Line 61, delete "of system" and insert -- of a system --, therefor.
3. In Column 2, Line 6, delete "tine" and insert -- the --, therefor.
4. In Column 4, Line 62, delete "Load into" and insert -- loaded into --, therefor.
5. In Column 7, Line 12, delete "1101" and insert -- 110A --, therefor.
6. In Column 8, Lines 58-59, delete "system. policies." and insert -- system policies. --, therefor.
7. In Column 9, Line 60, delete "4 it is a" and insert -- 4 is a --, therefor.
8. In Column 11, Line 48, delete "canal" and insert -- can --, therefor.
9. In Column 11, Line 65, delete "component or" and insert -- component of --, therefor.
10. In Column 12, Line 2, delete "In example" and insert -- In one example --, therefor.
11. In Column 12, Line 22, delete "500 call" and insert -- 500 can --, therefor.
12. In Column 13, Line 1, delete "provide functional" and insert -- provide functionality --, therefor.
13. In Column 14, Line 29, delete "to 710." and insert -- to 718. --, therefor.
14. In Column 14, Line 67, delete "of: the" and insert -- of the --, therefor.
15. In Column 15, Line 37, delete "provide functional" and insert -- provide functionality --, therefor.
16. In Column 16, Line 36, delete "implement encapsulation" and insert -- implement the encapsulation --, therefor.
17. In Column 16, Line 40, delete "to address" and insert -- to an address --, therefor.
18. In Column 16, Line 45, delete "a container identified" and insert -- a container is identified --, therefor.
19. In Column 17, Line 24, delete "din has" and insert -- NIC has --, therefor.
20. In Column 18, Line 31, delete "algorithm" and insert -- the algorithm --, therefor.
21. In Column 19, Line 42, delete "complied" and insert -- compiled --, therefor.
22. In Column 19, Line 55, delete "that configured" and insert -- that is configured --, therefor.
23. In Column 19, Line 62, delete "prompt data" and insert -- prompt if data --, therefor.

Signed and Sealed this
Fifteenth Day of April, 2025

Coke Morgan Stewart
*Acting Director of the United States Patent and Trademark Office*